May 12, 1964

C. B. STEVENS 3,132,892

VEHICLE GLOVE COMPARTMENT

Filed May 21, 1962

INVENTOR
Clifford Brooks Stevens
BY
Wayne B. Easton

May 12, 1964 C. B. STEVENS 3,132,892
VEHICLE GLOVE COMPARTMENT
Filed May 21, 1962 2 Sheets-Sheet 2

INVENTOR
Clifford Brooks Stevens
BY
Wayne B. Easton

3,132,892
VEHICLE GLOVE COMPARTMENT
Clifford B. Stevens, Milwaukee, Wis., assignor to Studebaker-Packard Corporation, South Bend, Ind., a corporation of Michigan
Filed May 21, 1962, Ser. No. 196,360
1 Claim. (Cl. 296—37)

This invention relates to dashboard assemblies for vehicles such as motor vehicles and relates more particularly to the portion of a dashboard assembly used for the storage of personal belongings which is commonly referred to as a glove compartment.

A conventional or prior art type of glove compartment is normally built into the dashboard assembly of a vehicle and is provided with a vertical door which is hinged from the bottom. Such a glove compartment is not convenient to use because the retrieval of articles stored therein involves a certain amount of annoying rummaging, especially when a person is hurriedly trying to find a particular article.

A main object of the present invention is to provide a dashboard assembly which has as a main feature thereof a new and improved storage container for personal articles which is referred to herein as a vanity bin.

Another object of the invention is to provide a new and improved storage container which is incorporated in the dashboard assembly so as to be aesthetically compatible therewith and at the same time have great utility.

Another object of the invention is to provide a new and improved storage container which not only has utility for storing personal objects but also has utility as a tray for food and drinks and as a vanity to aid the personal grooming of passengers in the vehicle.

Another object of the invention is to provide a new and improved storage container in which the necessary movement of the container, in being opened and closed, is confined to a path which does not infringe upon any of the passenger space in the vehicle.

Another object of the invention is to provide a new and improved mechanism for guiding the storage compartment from its closed to its open position.

Other objects of the invention will become apparent from the following specification, the drawings, and the appended claim.

Figure 1:
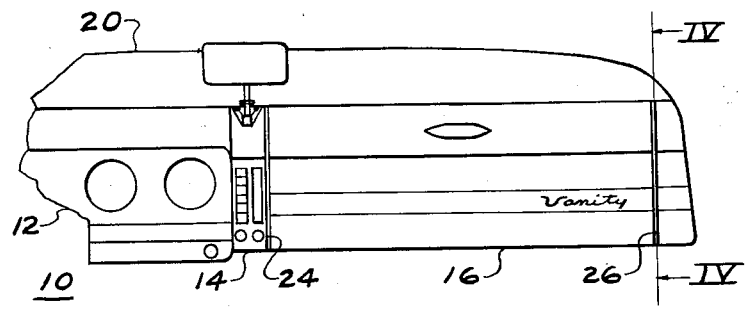
FIG. 1 is a front view of a dashboard assembly in which a new and improved storage container, or vanity bin, is incorporated in accordance with the present invention.

Referring to the drawings, the view of the dashboard assembly in FIG. 1 shows a dashboard assembly 10 which includes an instrument panel 12, a radio 14, a vanity bin 16 and a supporting structure 18. Reference will be made hereafter to the term dashboard, as distinguished from dashboard assembly, and it will be understood that the dashboard 20, as shown in FIGS. 1 and 2, means the dashboard assembly 10 minus the vanity bin 16.

Figure 2:
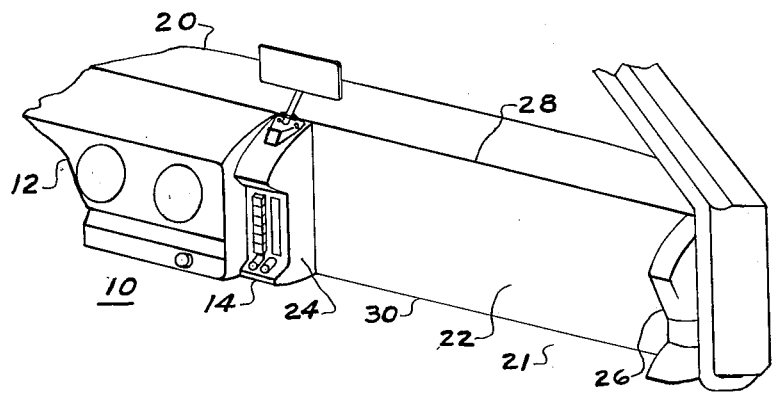
FIG. 2 is a perspective view of the dashboard assembly with the vanity bin removed therefrom.

Referring to FIG. 2, the dashboard 20 is recessed to form a recess 21 which is defined by a generally vertical wall portion 22, which extends longitudinally of the dashboard, and by transversely extending wall portions 24 and 26. The portion of dashboard 20 which houses instrument panel 12 and radio 14, and the portion of the dashboard to the right of the recess 20, protrude relative to the recessed wall 22.

Recessed wall portion 22 may have upper and lower edges 28 and 30, as illustrated, and these edges may be parallel to each other.

Figure 4:
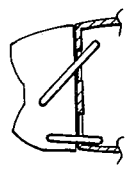
FIG. 4 is a sectional view taken on line IV—IV of FIG. 1 and shows a side view of the vanity bin in a closed position.
Figure 5:
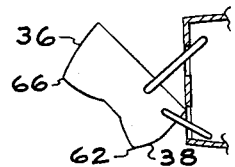
FIG. 5 is similar to FIG. 4 but shows the vanity bin in an intermediate position.

Vanity bin 16 is housed in the recess 21 and is shown in its shut position in FIGS. 1 and 4. Vanity bin 16 has, as its name implies, the general shape of a bin and it comprises a bottom portion 34, side walls 36 and 38, and end walls 40 and 42. Walls 36, 38, 40 and 42 terminate in a plane and define an opening 44 for the top of bin 16. The tops of side walls 36 and 38 form edges 46 and 48 which may be parallel to each other and which may also be aligned with the upper and lower edges 28 and 30 of recessed wall 22 of the dashboard.

Two lids 50 and 52, hinged on the edge 48 of bin 16, cover the opening of the bin and latch means (not shown) are provided to hold the lids in closed positions. Compartments in the bin can be provided as desired and three compartments are shown by way of example. The top of lid 50 is provided with recesses for receiving cups or bottles and the top of lid 52 may be simply a flat surface for holding food or other articles. The inside of lid 52 may be provided with a mirror 54.

Figure 7:
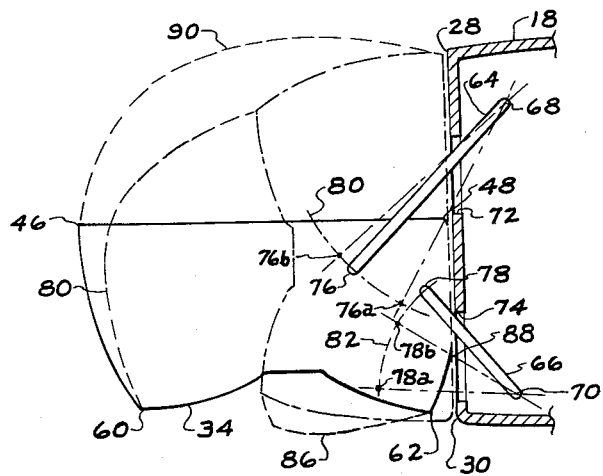
FIG. 7 is similar to FIG. 6 and shows the path of several points of the vanity bin, and the angular movement of its two guiding links, as the vanity bin moves from its open to its closed position.

When vanity bin 16 is in a closed position, as shown in FIGS. 1, 4 and 7, the wall edges which form the opening 44 of the bin are in a vertical plane in abutting or near abutting engagement with the dashboard vertical wall portion 22. In this closed position the edges 46 and 48 of the opening 44 of the bin may be aligned with the edges 28 and 30 of dashboard wall 28 so that bin walls 36 and 38 blend surfacewise and aesthetically with the upper and lower surfaces 56 and 58 of dashboard supporting structure 18. The bin wall surfaces 36 and 38 and the surface of the bottom portion 34 also may blend surfacewise with the surfaces of the protruding portions of the dashboard on both sides of the vanity bin.

Figure 6:
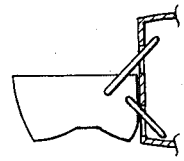
FIG. 6 is similar to FIG. 4 but shows the vanity in its open position.
Figure 3:
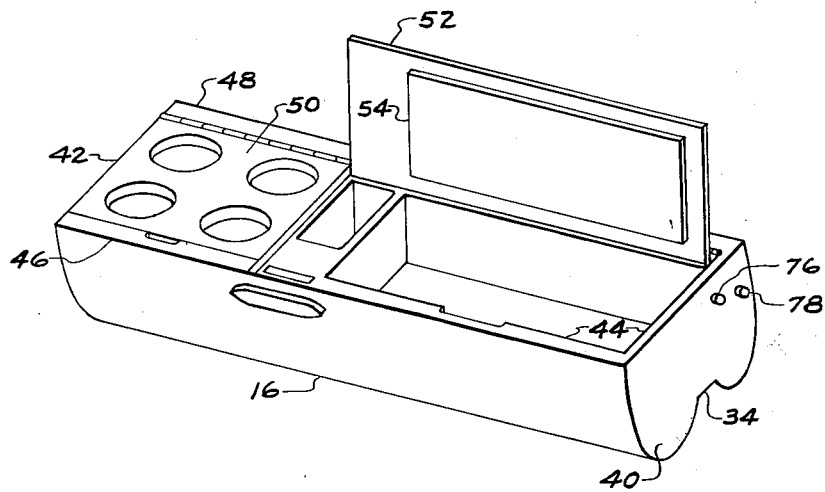
FIG. 3 is a perspective view of the vanity bin.

When vanity bin 16 is in an open position, as shown in FIGS. 6 and 7, the bin is preferably in abutting or near abutting engagement with the vertical, recessed dashboard wall 22 with the opening 44 of the bin being in a horizontal plane between the upper and lower edges 28 and 30 of the dashboard wall 22. The lowermost edges 60 and 62 of the bin bottom portion 34 are preferably in the same plane as, and no lower, than, the edge 30 of dashboard wall 22 so as to not infringe upon passenger leg room. When the vanity bin is in this open position it can be used as a food and drink tray with glasses or cups being receivable in the recesses in lid 50 and food being restable on the top of lid 52. Lids 50 and 52 may be opened to gain access to the compartments which they cover.

Vanity bin 16 is, in accordance with the invention, swingable from its shut position to its open position without infringing upon the passenger space of the vehicle in which it is installed. Means such as fixed guides may be provided to guide vanity bin 16 from its shut position to its open position but the means illustrated herein for facilitating that function are links 64 and 66. Links 64 and 66 have fixed and free ends and move in a vertical plane. The fixed ends of the links are pivotally connected to the supporting structure 18 of the dashboard and pivot about pivot points 68 and 70. The links extend through slots 72 and 74 in dashboard wall 22 and their moveable ends are pivotally connected to wall 40 of the vanity bin and the moveable ends are pivotal about pivot points 76 and 78 on the wall 40.

The locations for the four pivot points 68, 70, 76 and 78 for the two links, and the lengths of the links, are determined in a novel and ingenious manner. This is done by first determining the desired path of the vanity bin in moving from its closed position to its open position. In this case, by way of example, the upper inner edge 48 of the vanity bin should be held close to the dashboard wall 22 during the opening and closing movements so that the bin will not infringe on any passenger space to the rear of it. At the same time the bottom portion 34 of the bin should not be allowed to drop any substantial distance below the level of the lower edge 30 of the dashboard wall 22 to avoid infringing on passenger leg room. These two requirements for avoiding the infringement of passenger space can be met by choosing two pivot points on the vanity bin wall 40, such as points 76 and 78, almost at random but with some degree of discretion. Considering only pivot point 76 for the moment, that point will be at the point indicated when the bin is in an open position, is at point 76a when the bin is in a closed position, and it will be at point 76b when the bin is in an intermediate position. Now by finding the center of an arc 80 of a circle which passes through points 76, 76a and 76b, the length of the link 64 and the fixed pivot point 68 for the link 64 are determined. Likewise, with regard to pivot point 78, that point is at the point indicated when the bin is in an open position, is at point 78a when the bin is in a closed position, and it will be at point 78b when the bin is in an intermediate position. The center of an arc 82 of a circle which passes through points 78, 78a and 78b indicates the length of link 66 and the location of the fixed pivot point 70 for the link 66.

Some trial and error attempts may be necessary in choosing points 76 and 78 initially but with the aid of the disclosure herein the determination of these points is well within the capabilities of any competent draftsman. The exact locations for points 76 and 78 may vary even for the same installation and it is only after these points are chosen that the exact lengths of links 64 and 66 and the locations of the fixed pivots 68 and 70 are determined.

The paths taken by four reference points on the bin as the bin is moved from its open position to its closed position are shown by broken lines 84, 86, 88 and 90.

The invention may be embodied in other specific forms without departing from the spirit or essential characteristics thereof. The embodiment of the invention described and shown is therefore to be considered in all respects as illustrative and not restrictive, the scope of the invention being indicated by the appended claim rather than by the foregoing description, and all changes which comes within the meaning and range of equivalency of the claim are therefore intended to be embraced therein.

It is claimed and desired to secure by Letters Patent:

A dashboard assembly comprising a dashboard having a protruding portion extending longitudinally thereof and a recessed generally vertical wall portion with upper and lower parallel edges, a vanity bin having a bottom portion and walls which terminate in a plane and define an opening for said bin having first and second parallel edges, said vanity bin having a shut position wherein (1) said opening is in a vertical plane in abutting or near abutting engagement with said vertical wall portion with (2) said parallel edges of said opening being aligned with said upper and lower edges of said recessed wall portion of said dashboard and (3) said walls and bottom portion of said bin being formed to blend surfacewise with said protruding portion of said dashboard, said vanity bin having an open position wherein (1) said bin is in abutting or near abutting engagement with said recessed wall portion of said dashboard and (2) said opening of said bin is in a generally horizontal plane between said upper and lower edges of said recessed wall portion and (3) said bottom portion of said bin is generally in horizontal alignment with said lower edge of said recessed portion, means connecting said vanity bin to said dashboard for allowing said vanity bin to swing between said closed and open positions with one of said parallel edges of said opening being moved upwardly in a vertical plane closely spaced to said recessed wall portion of said dashboard and with said bottom portion of said bin being moved from a generally vertical position to a generally horizontal position without dropping substantially below the level of said lower edge of said dashboard wall portion, comprising at least two links having fixed and free ends and being pivotally connected for movement in a vertical plane with their fixed ends being pivotally connected to said dashboard and their free ends being pivotally connected to said vanity bin, and lid means for said opening of said vanity bin.

References Cited in the file of this patent
UNITED STATES PATENTS

| | | |
|---|---|---|
| 541,858 | Inger | July 2, 1895 |
| 1,411,377 | Robinson | Apr. 4, 1922 |
| 2,073,171 | Pittroff | Mar. 9, 1937 |
| 2,301,730 | Mann | Nov. 10, 1942 |
| 2,547,101 | Uttz | Apr. 3, 1951 |
| 2,554,685 | St. Denis | May 29, 1951 |
| 2,673,056 | Manetti | Mar. 23, 1954 |
| 2,789,861 | Hudson | Apr. 23, 1957 |
| 2,883,234 | Biondo | Apr. 21, 1959 |
| 2,982,393 | Erbst | May 2, 1961 |